(12) United States Patent
Weisenberg et al.

(10) Patent No.: US 11,181,222 B2
(45) Date of Patent: *Nov. 23, 2021

(54) INTERNAL PIPE LINING SYSTEM HAVING SELF-PROPELLED, SELF-POWERED PROPULSION DEVICES

(71) Applicant: Sipp Technologies, LLC, Wichita, KS (US)

(72) Inventors: Kent Weisenberg, Fruit Cove, FL (US); Eric Hayes, Jacksonville, FL (US)

(73) Assignee: SIPP TECHNOLOGIES, LLC, Wichita, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/363,755

(22) Filed: Mar. 25, 2019

(65) Prior Publication Data
US 2019/0219216 A1 Jul. 18, 2019

Related U.S. Application Data

(63) Continuation-in-part of application No. 15/650,316, filed on Jul. 14, 2017, now Pat. No. 10,239,081.

(60) Provisional application No. 62/504,023, filed on May 10, 2017.

(51) Int. Cl.
| *F16L 55/32* | (2006.01) |
| *B05B 13/06* | (2006.01) |
| *B05B 12/00* | (2018.01) |
| *F16L 55/18* | (2006.01) |

(Continued)

(52) U.S. Cl.
CPC ............ *F16L 55/32* (2013.01); *B05B 12/004* (2013.01); *B05B 13/06* (2013.01); *B05B 13/0636* (2013.01); *F16L 55/18* (2013.01); *F16L 55/1645* (2013.01); *F16L 2101/16* (2013.01)

(58) Field of Classification Search
USPC ........ 118/306, 317, 323, 712; 239/226, 752, 239/753
See application file for complete search history.

(56) References Cited

U.S. PATENT DOCUMENTS

| 3,461,264 A * | 8/1969 | Sims | B23K 9/0284 |
| | | | 219/60 R |
| 4,006,359 A * | 2/1977 | Sullins | G01M 3/005 |
| | | | 378/60 |

(Continued)

FOREIGN PATENT DOCUMENTS

DE    19641887 A1 * 11/1997 .......... F16L 58/1027

*Primary Examiner* — Yewebdar T Tadesse
(74) *Attorney, Agent, or Firm* — Thomas C. Saitta

(57) ABSTRACT

Self-propelled, self-powered, propulsion devices as part of pipe lining system adapted to create an internal liner member on a pipe or other tubular structure, the system being the combination of a sprayer apparatus, an umbilical member connected to the sprayer apparatus, wherein the umbilical member supplies no power or communications to the propulsion devices, and a plurality of propulsion devices mounted externally onto the umbilical member in a removable manner. The spraying apparatus and propulsion devices are independently powered and controlled such that each may be accelerated or decelerated as required to maintain the sprayer apparatus at a constant speed during the application process.

6 Claims, 6 Drawing Sheets

(51) Int. Cl.
*F16L 101/16* (2006.01)
*F16L 55/1645* (2006.01)

(56) References Cited

U.S. PATENT DOCUMENTS

| | | | | |
|---|---|---|---|---|
| 5,913,977 | A * | 6/1999 | Nichols | F16L 55/1645 |
| | | | | 118/712 |
| 6,699,324 | B1 * | 3/2004 | Berdin | B05B 13/0636 |
| | | | | 118/306 |
| 7,726,256 | B1 * | 6/2010 | Weisenberg | B05B 13/0636 |
| | | | | 118/323 |
| 10,239,081 | B2 * | 3/2019 | Weisenberg | B05B 13/0636 |
| 2007/0000406 | A1 * | 1/2007 | Stout | F16L 55/32 |
| | | | | 104/138.2 |
| 2012/0172507 | A1 * | 7/2012 | Weisenberg | C09D 175/04 |
| | | | | 524/156 |
| 2014/0027000 | A1 * | 1/2014 | Kiest, Jr. | F16L 55/265 |
| | | | | 138/97 |
| 2015/0071032 | A1 * | 3/2015 | Sillick | G01V 1/3808 |
| | | | | 367/21 |
| 2015/0122364 | A1 * | 5/2015 | Cheatham, III | F16L 55/1283 |
| | | | | 138/98 |
| 2017/0182605 | A1 * | 6/2017 | Rajagopalan | B23K 9/0282 |

* cited by examiner

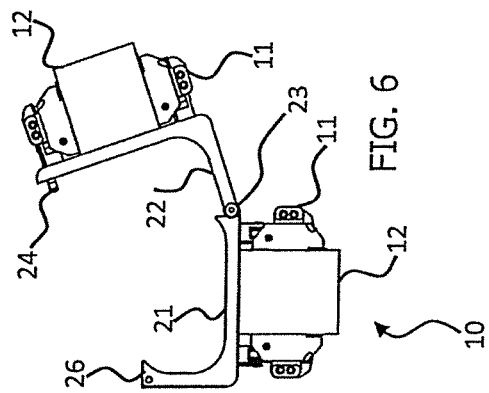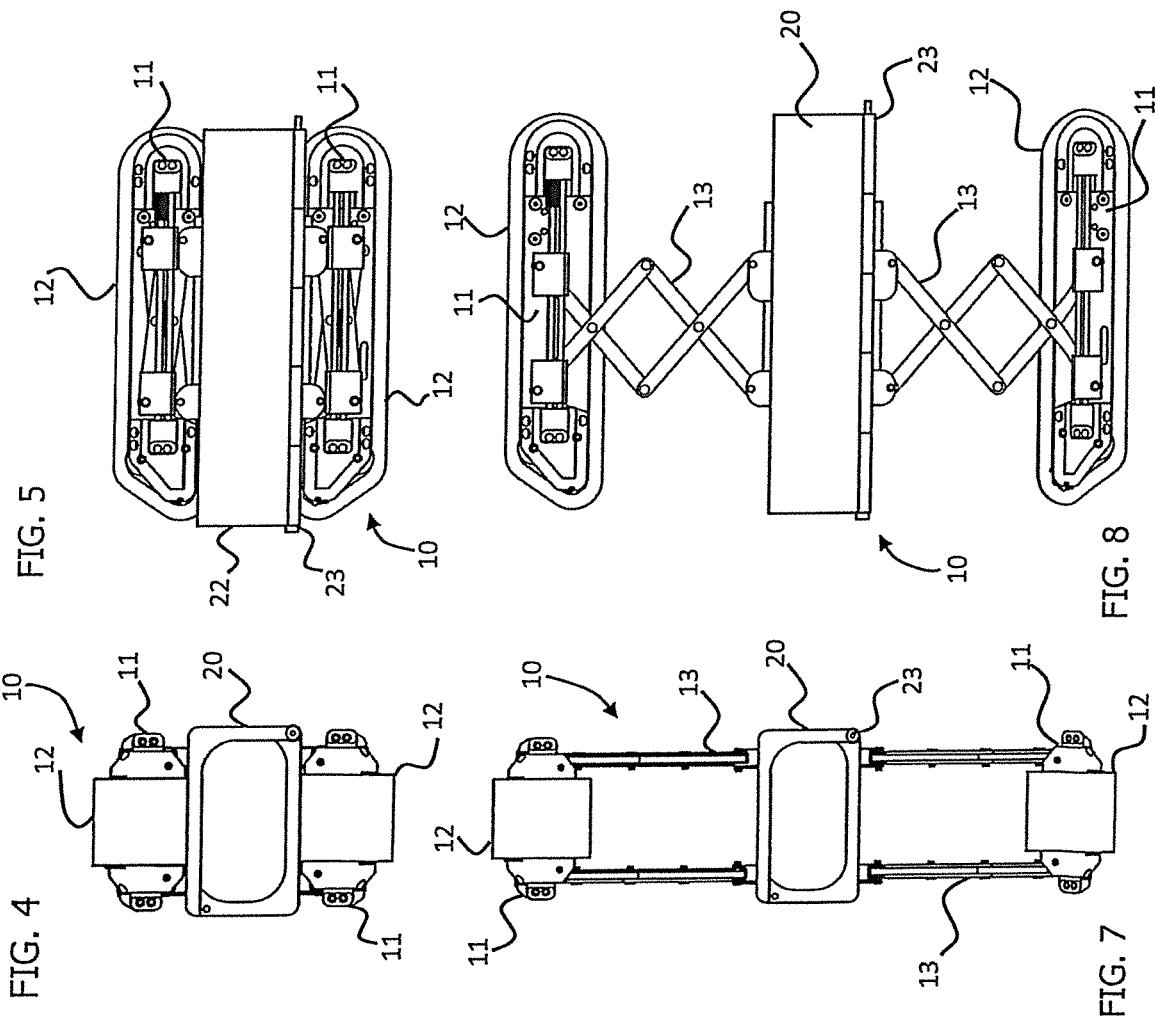

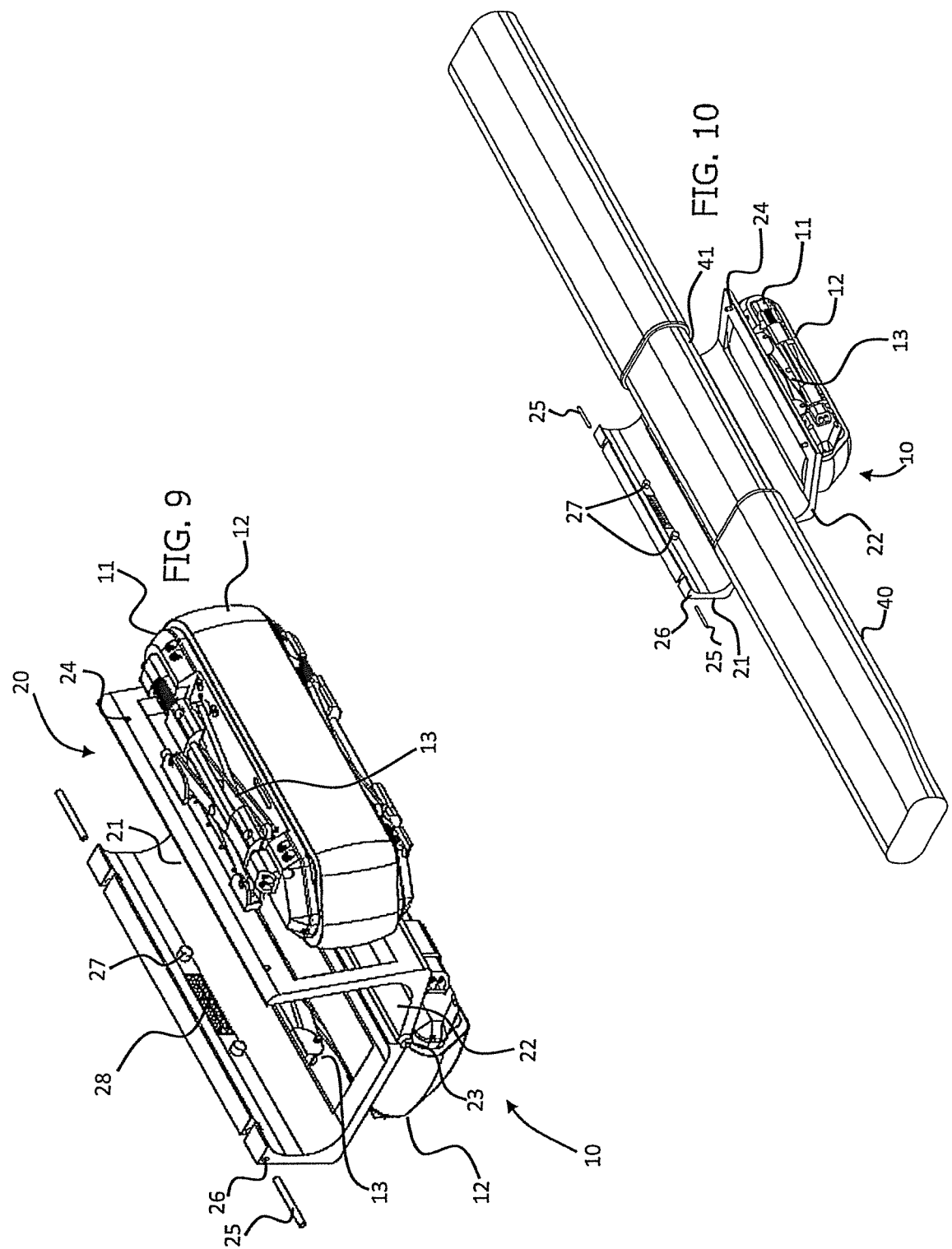

INTERNAL PIPE LINING SYSTEM HAVING SELF-PROPELLED, SELF-POWERED PROPULSION DEVICES

BACKGROUND OF THE INVENTION

This invention relates generally to internal pipe lining rehabilitation devices or systems, and more specifically relates to lining systems that are adapted and adaptable for use in the structural repair or remediation of degraded, damaged or leaking pipes, or such lining systems adapted and adaptable to improve or upgrade qualities and characteristics of pipes prior to or after use or installation. Even more specifically, this invention relates to lining systems that spray a lining onto the internal pipe surface for rehabilitation or remediation of an existing host pipe.

Lining devices for pipe rehabilitation that spray a liner onto the internal surface of a pipe in need of repair whereupon the liner cures to form a "pipe-within-a-pipe", are typically referred to by the acronym SIPP, which stands for Spray-In-Place-Pipe. Pipe rehabilitation rather than pipe replacement is practiced heavily in industrial and municipal water markets due to two primary advantages. Firstly, the cost of pipe rehabilitation is significantly cheaper than pipe replacement. Secondly, pipe rehabilitation is far less of an invasive practice than replacement. For instance, replacing a pipeline running under a major road or building results in a major disruption to a community and in some cases, is not a feasible solution. Thus, pipe rehabilitation methods are a highly valued solution and far more desirable in many situations.

Structural (i.e., self-defined, stand-alone or self-sustaining) linings installed by polymeric spray or SIPP devices for piping systems are currently without an industry installation standard. The difficulty in setting design standards arises because of the many different types of lining faults, such as ringing, puddling, thickness inconsistencies, and lining voids, which result from current rehabilitation methods. These lining faults are a direct result of the past manufacturers inability to overcome the mechanical function insufficiencies of the SIPP or similar equipment that are the direct causation of these faults.

The common SIPP devices utilize an accumulator reel to retract an umbilical or tether tensile member (the term "umbilical" being used hereafter to refer collectively to an umbilical, tether, tension member or similar tensile structure or combination of such members, and containing or further comprising material, electrical and communication transmission members) which is attached to the spraying device as it sprays the liner onto the inner pipe wall. Accumulator reel torque is transmitted by the umbilical member into a tensile load on the sprayer device. These SIPP devices produce a liner, that is unpredictable in thickness due to what is known as "stick-slip" phenomenon—the changing resistive force during the application process due to the capstan effect from variations in pipe geometry (i.e., friction on the umbilical member due to pipe bends and turns), elasticity of the umbilical member, drag on the umbilical member resulting from droop or sag due to the extended length of the umbilical member, and sprayer head positioning. When the spraying apparatus sticks, it slows or stops momentarily and excessive liner forming material is sprayed onto the pipe over a short distance, resulting in a liner that is too thick over this segment. When the spraying apparatus then unsticks, i.e., slips, it moves forward too rapidly, resulting in segments where the liner is too thin. These inconsistencies are typically visibly obvious and are commonly referred to as the ringing effect or more simply "ringing". The ringing effect compromises the structural integrity and hydraulic capacities of the liner.

There are three main elements in the common SIPP system: a spraying or lining apparatus, an umbilical member, and an accumulator reel. The spraying function is performed by a mechanism that dispenses, propels or otherwise distributes uncured liner material, such as for example a polymer resin, onto the inner surface of the pipe. The liner material then cures in place to form a structural liner or lining—i.e., a new internal layer or pipe within the original pipe. The umbilical member contains conduits that convey the liner material from a pumping source, e.g., external or internally disposed tanks, to the sprayer apparatus and houses any electrical wires needed to send power and communicative signals between elements of the SIPP system within the pipe and external to the pipe. Additionally, the umbilical member houses a separate, or comprises as a whole, a tension member extending between the accumulator reel and the spraying device, such that the umbilical member pulls the sprayer apparatus through the pipe. The accumulator reel is a reel that houses, deploys, and accumulates the umbilical member.

Almost all current SIPP lining devices are static, non-self-propelled units, also referred to as Pull-Through (PT) technology or devices. PT technology is an appropriate term due to the mechanical means by which the devices are driven during the lining process. PT devices are pulled through the pipe by an external driving mechanism, most commonly a powered accumulator reel or winch. These lining devices are mounted on skids, wheels or rollers which help reduce the frictional drag between device and pipe wall.

Due to gravitational forces and its extended length, the umbilical member will usually sag and make contact with the bottom of a pipe, resulting in increased friction and drag. The tensile load exerted by the accumulator reel is a result of friction between the umbilical member and the pipe wall, and/or the spraying apparatus and pipe wall. The second frictional force is constant since it is rigid and has nearly a fixed contact area with the pipe wall. The first and most significant frictional force is the friction on the umbilical member. For a straight pipe, the tensile load required has a linear relationship, increasing linearly with increasing lining distance. Sagging of the umbilical member directly affects the tensile load. When bends are present in the pipe the tensile load must additionally account for the capstan effect that increases exponentially proportional to the summation of the total contact wrap angle between umbilical member and the pipe wall.

Some SIPP systems have recently attempted to diminish lining faults by providing a self-propelled spraying apparatus. While this does have some effect on the consistency of the lining, the system is still erratic in liner application due to the lack of controlled velocity of the umbilical member itself. The mass of the umbilical member in conjunction with the surface contact area has dramatically more influence on the consistency of a liner than does the ability to control the propulsion of the small spraying apparatus alone. A self-propelled lining device has no mitigating effect regarding the capstan effect or nonlinear friction imparted on the umbilical member. It should also be noted that a self-propelled spraying apparatus cannot provide the required force to pull an umbilical member of significant length (e.g., greater than 150 feet) into the pipe. Even with a self-propelled spraying apparatus the umbilical member still requires that the umbilical member be winched down through the pipe to the starting point.

To address these problems and provide a pipe liner with consistent thickness, it is an object of this invention to provide a self-propelled SIPP or similar type internal pipe lining system that comprises multiple propulsion devices, with one propulsion device being directly associated with the sprayer apparatus such that the sprayer apparatus is essentially self-propelled, and with the remaining plurality of propulsion devices being associated with the umbilical member at spaced intervals, thereby enabling the use of longer umbilical members. The propulsion devices are self-propelled—each propulsion device having a dedicated motor or similar powered driving mechanism. In this manner, the internal pipe lining system is essentially self-propelled for both insertion and retraction during the lining operation, such that little to no retraction force need be applied by the accumulator reel or similar delivery and feed device, if present. It is a further object to provide the umbilical member propulsion devices as modular units capable of rapid attachment and detachment from the umbilical member, thereby enabling the propulsion devices to be quickly removed from the umbilical member during the rewind operation, and preferably wherein there is no communication through the umbilical member to the individual propulsion devices, i.e., the propulsion devices are self-powered, remotely controlled communicate via radio or similar non-hardwired means, with no power, information-transfer or control communications being delivered to the propulsion devices through the umbilical member. It is a further object to provide such umbilical member propulsion devices as independent units that are each self-propelled, and further such that the umbilical member propulsion devices in certain embodiments comprise sensors for autonomous steering and control. It is a further object to provide such umbilical member propulsion devices in combination with a self-propelled internal pipe lining system that comprises travelling supply tanks such that the umbilical member is utilized to connect the various devices of the system cut is not required to extend from the pipe being lined to connect or communicate with externally mounted delivery or feed devices.

SUMMARY OF THE INVENTION

The invention is in general in certain embodiments a self-propelled pipe lining system forming or creating an internal liner member on a pipe or other tubular structure, the system comprising a sprayer or lining apparatus, an umbilical member connected to the sprayer apparatus, a plurality of propulsion devices mounted onto the umbilical member, and an accumulator reel for retaining the umbilical member. The sprayer apparatus radially and circumferentially applies liner material onto the inner wall of the pipe as it passes through the pipe, the liner material curing to form the liner. The sprayer apparatus is provided with a propulsion device or otherwise structured so as to be self-propelled. The elongated umbilical member, which may act as a tension member if needed, comprises mechanisms, conduits or members transmitting, delivering or supplying lining material, electrical power and communication signals to and/or from the sprayer apparatus and propulsion members, and further comprises periodically-spaced mounting segments adapted to receive the propulsion devices. The propulsion devices comprise motorized drive units to propel the propulsion devices within the pipe and, more preferably, extension assemblies to radially extend and retract the drive units for optimum traction on the inner wall of the pipe. The propulsion devices are removably mounted onto the mounting segments of the umbilical member.

In use, the sprayer apparatus is inserted into the pipe and actuated so as to advance under self-power through the pipe as the umbilical member plays out from the accumulator reel. As a mounting segment passes from the accumulator reel, a propulsion device is affixed to the mounting segment and actuated so as to advance under self-power through the pipe, thereby pulling the umbilical member. Once the starting location for applying the lining material is reached by the sprayer apparatus, the propulsion devices reverse direction and travel at a preset speed such that the sprayer apparatus moves at a consistent speed back through the pipe toward the accumulator reel. Each propulsion device is independently powered, such that any individual propulsion device will automatically accelerate or decelerate to account for physical conditions in the pipe affecting travel of the propulsion device, segments of the umbilical member or the sprayer apparatus. As each propulsion device exits the pipe, it is removed from the umbilical member prior to the umbilical member being rewound onto the accumulator reel.

In other embodiments the invention is in general a self-propelled, self-powered, pipe lining system forming or creating an internal liner member on a pipe or other tubular structure, the system comprising a sprayer or lining apparatus, an umbilical member connected to the sprayer apparatus, and a plurality of self-propelled, self-powered, propulsion devices mounted onto the umbilical member. The sprayer apparatus radially and circumferentially applies liner material onto the inner wall of the pipe as it passes through the pipe, the liner material curing to form the liner. The sprayer apparatus is provided with a dedicated propulsion device or otherwise structured so as to be self-propelled. The elongated umbilical member comprises mechanisms, conduits or members transmitting, delivering and/or supplying electrical power and communication signals to and/or from the sprayer apparatus. In certain preferred embodiments the propulsion devices are self-powered and the umbilical member does not transmit, deliver or supply electrical power and communication signals to the self-propelled propulsion devices, in which instance batteries and wireless communication systems are provided for each propulsion device, which may be remotely controlled or provided with sensors so as to be autonomous with regard to steering, speed, direction, control, etc. The propulsion devices comprise motorized drive units to propel the propulsion devices within the pipe and may include extension assemblies to radially extend and retract the drive units for optimum traction on the inner wall of the pipe. The propulsion devices are removably mounted onto the exterior of the umbilical member, such as by a clamping mechanism, at any point on the umbilical member.

Alternatively summarized, the invention in certain embodiments is an internal pipe lining system comprising: a sprayer apparatus adapted to apply lining material to the interior of a pipe; an umbilical member connected to said sprayer apparatus and delivering lining material to said sprayer apparatus; and propulsion devices removably mounted onto said umbilical member at spaced intervals, each of said propulsion devices being self-propelled and self-powered, and each of said propulsion devices communicating wirelessly with an external operator. Further, such invention wherein said propulsion devices are mountable onto said umbilical member at any location on said umbilical member; wherein one of said propulsion devices propels said sprayer apparatus; wherein said propulsion devices receive no power from said umbilical member; wherein each of said propulsion devices comprise one or more motorized drive units, each said motorized drive actuating a traction member; wherein each of said propulsion devices further comprises one or more batteries to power said one or more motorized drive units; wherein each of said propulsion devices is independently controlled, such that the travel speed of each of said propulsion devices can be increased or decreased independently; wherein each of said propulsion devices comprises one or more sensors; wherein each of said propulsion devices further comprises a processing system receiving information from said one or more sensors such that each of said propulsion devices is capable of autonomous operation; wherein said system is self-contained such that said umbilical member does not extend from the pipe during application of the lining material to the pipe; wherein said propulsion devices comprise a mounting assembly; wherein said mounting assembly comprises clamping jaws structured to receive said umbilical member therebetween; and/or wherein said mounting assembly further comprises an actuating handle, a clamp arm member and clamp sleeve member wherein said clamping jaws and can be closed to secure said propulsion device onto said umbilical member by actuating said actuating handle and can be opened to release said propulsion device from said umbilical member by actuating said actuating handle.

Alternatively, embodiments wherein the invention is an internal pipe lining system comprising: a sprayer apparatus adapted to apply lining material to the interior of a pipe; an umbilical member connected to said sprayer apparatus and delivering lining material to said sprayer apparatus; and propulsion devices removably mounted onto said umbilical member at spaced intervals, each of said propulsion devices being self-propelled and self-powered, and each of said propulsion devices communicating wirelessly with an external operator; wherein said propulsion devices are mountable onto said umbilical member at any location on said umbilical member; wherein said propulsion devices receive no power from said umbilical member; wherein each of said propulsion devices comprise one or more motorized drive units, each said motorized drive actuating a traction member; wherein each of said propulsion devices further comprises one or more batteries to power said one or more motorized drive units; and wherein each of said propulsion devices is independently controlled, such that the travel speed of each of said propulsion devices can be increased or decreased independently. Further, such invention wherein said system is self-contained such that said umbilical member does not extend from the pipe during application of the lining material to the pipe; wherein each of said propulsion devices comprises one or more sensors and a processing system receiving information from said one or more sensors such that each of said propulsion devices is capable of autonomous operation; wherein said propulsion devices comprise a mounting assembly comprising clamping jaws structured to receive said umbilical member therebetween; and/or wherein said mounting assembly further comprises an actuating handle, a clamp arm member and clamp sleeve member wherein said clamping jaws and can be closed to secure said propulsion device onto said umbilical member by actuating said actuating handle and can be opened to release said propulsion device from said umbilical member by actuating said actuating handle.

BRIEF DESCRIPTION OF THE DRAWINGS

FIG. 4 is an end view of the propulsion device shown in FIG. 1.

FIG. 5 is a side view of the propulsion device of FIG. 4.

FIG. 6 is an end view of the propulsion device of FIG. 1 shown with the mounting assembly in the open configuration.

FIG. 7 is an end view of an embodiment of the propulsion device having an extension assembly, the extension assembly shown in the extended configuration.

FIG. 8 is a side view of the propulsion device of FIG. 7.

FIG. 9 is a perspective view of the propulsion device of FIG. 1, shown in the open configuration.

FIG. 10 is a perspective view of the propulsion device of FIG. 9, shown as partially mounted onto the umbilical member.

DETAILED DESCRIPTION OF THE INVENTION

Figure 1:
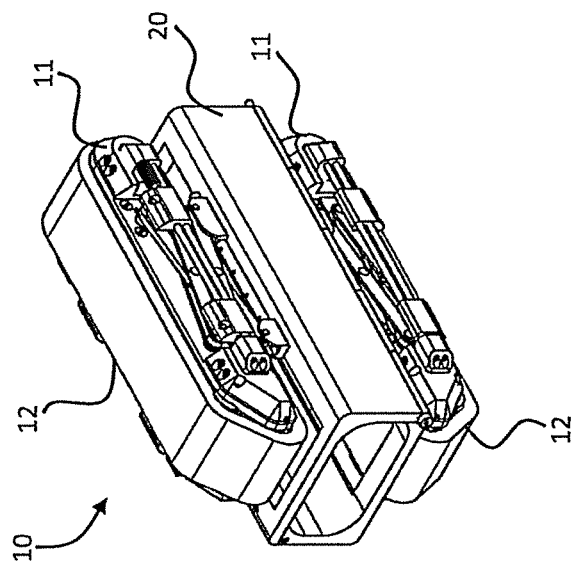
FIG. 1 illustrates an embodiment of the propulsion device showing a pair of motorized drive units.

With reference to the drawings, which are provided for descriptive, disclosure, enablement and illustrative purposes, it being intended that the drawings be non-limiting as to the scope and definition of the invention, the invention is shown in various embodiments as comprising in general a self-propelled pipe lining system adapted to form an internal liner or lining member 92 member on a pipe or other tubular structure 91, the system comprising a sprayer or lining apparatus 30, an umbilical member 40 connected to the sprayer apparatus 30, a plurality of independent, self-powered propulsion devices 10 mounted onto the umbilical member 40, and an accumulator reel or similar mechanism 50 for retaining, deploying and retrieving the umbilical member 40. The sprayer apparatus 30 circumferentially applies liner material onto the inner wall of the pipe 91 as it passes through the pipe 91, the liner material subsequently curing to form the liner 92. The sprayer apparatus 30 is provided with a propulsion device 10, either attached or incorporated within, or otherwise structured so as to be self-propelled. The umbilical member 40 comprises one or more material delivery devices, conduits or members adapted to supply lining material to the sprayer apparatus 30, one or more electrical power transmission devices, conduits or members adapted to provide power to the sprayer apparatus 30 and propulsion devices 10, and one or more communication signal transmission devices, conduits or members adapted to enable communications to and from the sprayer apparatus 30 and propulsion devices 10. The umbilical member 40 further comprises periodically-spaced mounting segments 41 adapted to receive the propulsion devices 10. The umbilical member 40 is sufficiently strong so as to act as a tension member if needed. The propulsion devices 10 comprise powered, motorized drive units 11 to propel the propulsion devices 10 within the pipe 91. Preferably, the propulsion devices 10 further comprise extension assemblies 13 adapted to radially extend and retract the drive units 11 for optimum traction on the inner wall of the pipe 91. The propulsion devices 10 are removably mounted onto the mounting segments 41 of the umbilical member 40.

As used herein, the term "sprayer apparatus" shall be taken to include a spraying or lining apparatus adapted to circumferentially apply, spray, propel or otherwise discharge a coating of a curable lining material onto the inner wall of a pipe, such as for example an uncured or partially cured polymer resin that self-cures or cures by heat, UV light or similar means, to form a tubular liner structure adhered to the interior of the pipe. The term "pipe" as used herein shall be taken to include any rigid tubular member composed for example of concrete, metal or a material with similar structural properties, and shall also be taken to include a previously applied and cured liner within a tubular structure onto which an additional internal liner is to be applied. As used herein, the term "umbilical member" shall be taken to include and/or refer collectively to any umbilical, tether, tension member or similar tensile structure or combination of such members, which also contains or comprises lining material supply conduits or the like, and possibly electrical power lines and communication transmission members, such as for example hoses, wires or fiber optics, which is utilized to connect the propulsion devices 10 and sprayer apparatus 30 in a train-like manner that allows for movement through the pipe.

Figure 3:
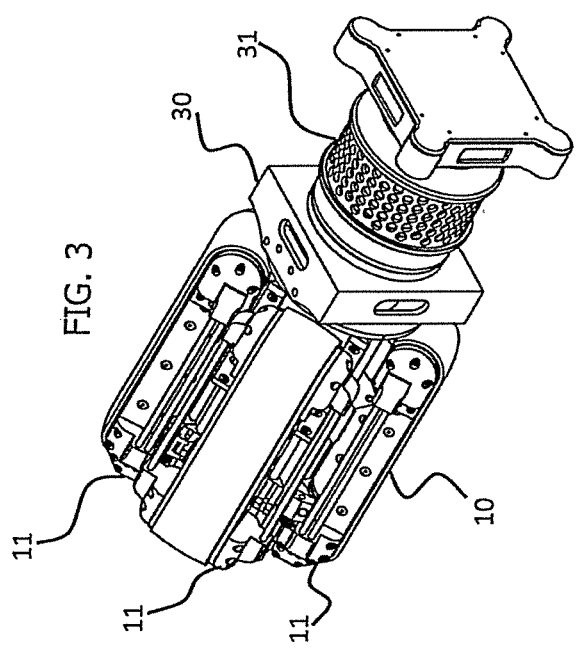
FIG. 3 is an illustration of an embodiment of a self-propelled sprayer apparatus with a dedicated propulsion device having four drive units.
Figure 11:
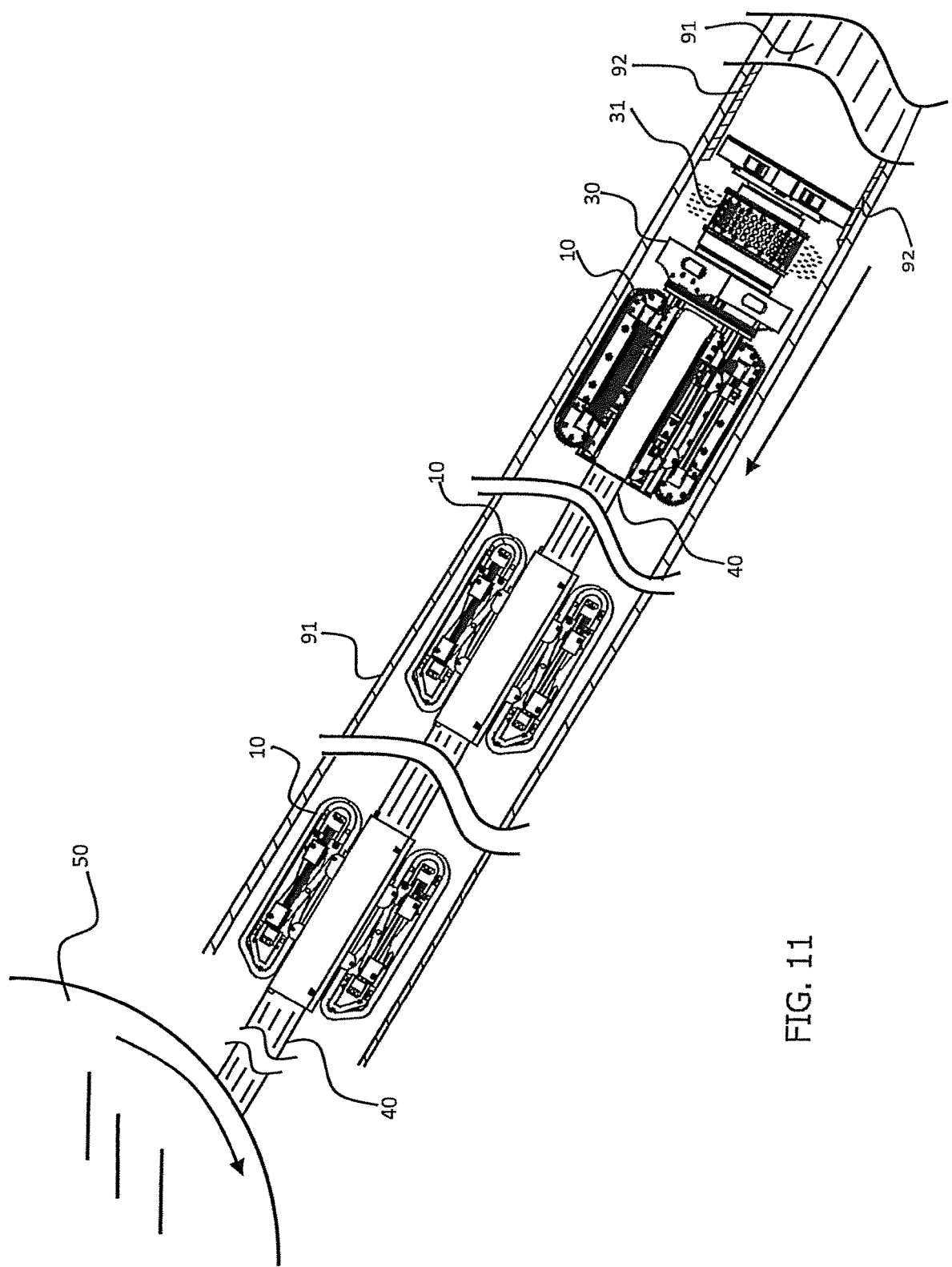
FIG. 11 is an exposed view of a pipe showing the accumulator reel, the umbilical member, plural propulsion devices and the self-propelled sprayer apparatus.

The sprayer apparatus 30 may be of known type, and typically comprises a rotating spinner assembly or head 31 that is adapted to circumferentially apply uncured or partially cured lining material onto the inner wall of the pipe 91, typically by radially expelling the lining material. The lining material, such as for example a polymer resin, adheres to the wall of the pipe 91 and cures to form an elastomeric or rigid liner 92, in essence creating a pipe within a pipe, the liner 92 repairing, sealing, strengthening, providing corrosion or abrasion resistance, etc., to the pipe 91 depending on the particular liner material chosen. The sprayer apparatus 30 is self-propelled, such that movement through the pipe 91 is accomplished by a dedicated propulsion device 10 or similar drive mechanism connected to or incorporated within the sprayer apparatus 20, rather than by being pulled through the pipe 91 by a powered accumulator reel 50. In this manner, the sprayer apparatus 30 is able to move through the pipe 91 at a controlled and consistent pace, continually applying the liner material to the pipe 91 so as to produce a liner 92 of consistent thickness. An embodiment of the motorized sprayer apparatus 30 is shown in FIG. 3, wherein the sprayer apparatus 30 is shown to comprise a propulsion device 10 having four drive units 11, although any number of drive units 11 may be utilized.

Figure 2:
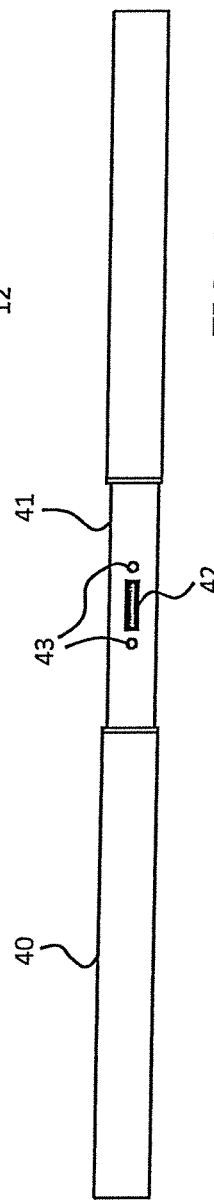
FIG. 2 is an illustration of an embodiment of a section of the umbilical member showing the mounting segment and electrical/communication connector.

The umbilical member 40, an embodiment of which is shown in FIG. 2, serves multiple functions in the system. The umbilical member 40 is an elongated member that may comprise multiple elongated members, conduits or devices bundled together, and/or may comprise elongated members retained within an elongated sheath, and/or the sheath itself may perform a function of the umbilical member 40. The umbilical member 40 is connected to the sprayer apparatus 30 and extends from the sprayer apparatus 30 to the accumulator reel 50, the umbilical member 40 being flexible enough to be wound onto the accumulator reel 50. The umbilical member 40 in this embodiment comprises a mechanism delivering uncured lining material (from an external pumping source), a mechanism delivering electrical power (from an external power source) and a mechanism transmitting communication signals (from and to an external control device, such as a computer, sensors, etc.) to the sprayer apparatus 30 and to the propulsion devices 10, as well as a mechanism providing tensile forces and linkage between the propulsion devices 10 and the sprayer apparatus 30. For example, the umbilical member 40 may comprise a hose to deliver the lining material, electrical wires to deliver power, and wire or optical fibers to provide communication between a main or control processor and the propulsion devices 10 and spraying apparatus 30.

The umbilical member 40 in this embodiment further comprises a plurality of mounting segments 41, preferably spaced at regular intervals along the umbilical member 40, such as for example one mounting segment 41 being disposed every 50 feet. The mounting segments 41 are structured to receive, mate or otherwise cooperate with the propulsion devices 10, and comprise an electrical connector 42 adapted to transmit electricity and communication signals to a propulsion device 10 mounted on the mounting segment 41. A pair of alignment sockets 42 may be provided to insure proper alignment of the propulsion device 10 on the mounting segment 41. The size and configuration of the mounting segments 41 is chosen such that they do not interfere with winding the umbilical member 40 onto the accumulator reel 50 or with passage of the umbilical member 40 through the pipe 91. By providing propulsion devices 10 at spaced intervals along the umbilical member 40, the friction problems caused by contact of the umbilical member 40 with the pipe surface are eliminated or reduced.

Movement of the internal pipe lining system is accomplished through a plurality of independent, self-propelled propulsion devices 10, as shown in various embodiments in FIGS. 1 and 4-11. Each propulsion device 10 comprises at least one and preferably multiple powered, motorized drive units 11, each of the drive units 11 actuating a traction member 12, such as a rotating belt, roller, wheel or similar member, that is adapted to contact the surface of the inner wall of the pipe 91 so as to propel the propulsion devices 10 along the pipe 91. A motor and a microcontroller or similar mechanism is provided in each propulsion device 10, such that each propulsion device 10 is independently self-powered and controlled. Sensors are provided in each propulsion device 10 such that the rate of travel is constantly monitored, whereby any decrease in speed resulting from increased friction, pipe geometries, etc., is immediately addressed with an increase in speed of the affected drive units 11, and whereby any increase in speed resulting from reduced friction, pipe geometries, etc., is immediately addressed with a decrease in speed of the affected drive units 11, thereby maintaining a constant rate of travel for each propulsion device 10 and for the sprayer apparatus 30.

For propulsion devices 10 sized for use in relatively large diameter pipes, the weight of the propulsion device 10 may be such that locating a single drive unit 11 and traction member 12, or a pair of closely associated drive units 11 and traction members 12, on the underside of the propulsion device 10 will be sufficient to provide enough traction to move the propulsion devices 10, the umbilical member 40 and the sprayer apparatus 30 through the pipe 91. In a more preferred embodiment, the propulsion device 10 will comprise two or more drive units 11 and traction members 12, which may be spaced equidistantly about the propulsion device 10, such that two drive units 11 are separated by 180 degrees, three drive units 11 are separated by 120 degrees, and four drive units 11 are separated by 90 degrees. With this design, better contact is maintained with the inner surface of the pipe 91.

Most preferably, the drive units 11 are mounted onto extension assemblies 13, as shown best in FIGS. 7 and 8, which are utilized to extend the drive units 11 radially outward to apply force against the inner wall of the pipe 91 normal to the travel direction, thereby greatly increasing traction. In the embodiment shown, the extension assemblies 13 are scissor-type assemblies which can be moved from a retracted position to an extended position as required by the internal diameter of the pipe 91, the amount of extension controlled by sensors, mechanical mechanisms or the like. The amount of extension may be self-determined and controlled by each propulsion device 10, or may be controlled by an external control processor or the like. Alternative mechanisms and assemblies other than the scissor-type assembly illustrated in the drawings may be utilized. By providing multiple drive units 11 arranged so as to make wall contact at equidistant positions and which may be extended as needed to provide sufficient traction, the propulsion devices 10 may be kept relatively lightweight and small, such that a propulsion device 10 may be utilized in small pipes 91 and in pipes 91 of differing internal diameters. The extension assemblies 13 are most preferably designed such that retraction from the extended position is automatic in the event that power is lost, as otherwise removal of the umbilical member 40, the propulsion devices 10 and the sprayer apparatus 30 from the pipe 10 will be difficult.

While the propulsion devices 10 may be permanently attached to the umbilical member 40 it is preferred that the propulsion devices 10 comprise a mounting assembly 20 so as to be removable from the umbilical member 40, and most preferred that the propulsion devices 10 be quickly attachable and detachable. The reason for this is that retrieval and deployment of the umbilical member 40 onto the accumulator reel 50 is simplified and more efficient if the bulky propulsion devices 10 are not wound onto the accumulator reel 50 along with the umbilical member 40. It is also important that removal of each propulsion device 10 from the umbilical member 40 be rapidly accomplished as each propulsion device 10 exits the pipe 91 without requiring stoppage or intermittent slowing of the retrieval process, as retrieval occurs as the sprayer apparatus 30 is continuing to apply the liner material onto the pipe 91 and constant travel speed of the spraying apparatus 30 needs to be maintained. The removal process for the propulsion devices 10 may be accomplished manually or specialized equipment may be utilized to automate the process.

As best shown in the embodiments illustrated in FIGS. 6, 9 and 10, each propulsion device 10 may comprise a mounting assembly 20 formed by the combination of a first jaw member 21 and a second jay member 22, the first and second jaw members 21/22 connected by a pivot hinge 23 such that they may be opened and closed in the manner of a clamshell. In the embodiment shown, a drive unit 11 is mounted to each of the L-shaped jaw members 21/22. For a propulsion device 10 having four drive units 11, the two additional drive units 11 would be mounted on the empty sides of the jaw members 21/22. The first jaw member 21 is provided with an electrical connector 28 adapted to mate with the electrical connector 42 located on the mounting segment 41 of the umbilical member 40, such that electrical power and communication signals are passed to and from the propulsion device through the umbilical member 40. A pair of alignment posts 27 are positioned so as to be received within the alignment sockets of the mounting segment 41 to assure proper alignment. The mounting assembly further comprises a locking mechanism, such as one or more locking pins 25 insertable into pin bores 26, the locking pins 25 abutting locking posts 24 located on the second jaw member 22 when inserted so as to prevent separation of the jaw members 21/22 until removed. In this manner, a propulsion device 10 may be quickly attached and detached from the umbilical member 40.

In use, the sprayer apparatus 30 is inserted into the pipe 91 and actuated so as to advance under self-power through the pipe 91 as the umbilical member 40 plays out from the accumulator reel 50. As a mounting segment 41 passes from the accumulator reel 50, a propulsion member 10 is affixed to the mounting segment 41 and actuated so as to advance under self-power through the pipe 91, thereby pulling the umbilical member 40. Actuation of the drive units 11 on the sprayer apparatus 50 and/or the propulsion devices 10 may occur automatically when each propulsion device is attached to the umbilical member 40, or may be accomplished manually, by a signal from the external control device, or by sensors mounted on the propulsion devices 10 and sprayer apparatus 30 which indicate they have been inserted into the pipe 91.

Once the sprayer apparatus 30 reaches the starting location for applying the lining material, the propulsion devices 10 reverse direction and travel at a preset speed such that the spraying apparatus 30 moves at a constant speed back through the pipe 91 toward the accumulator reel 50, which is rotated to retrieve and store the umbilical member 30. Each propulsion member 10 is independently powered, such that any individual propulsion member 10 will automatically accelerate or decelerate to account for physical conditions in the pipe 91 affecting travel of the propulsion member 10, segments of the umbilical member 40 and/or the spraying apparatus 30. As each propulsion member 10 exits the pipe 91, it is removed from the umbilical member 40 prior to the umbilical member 40 being rewound onto the accumulator reel 50.

Figure 12:
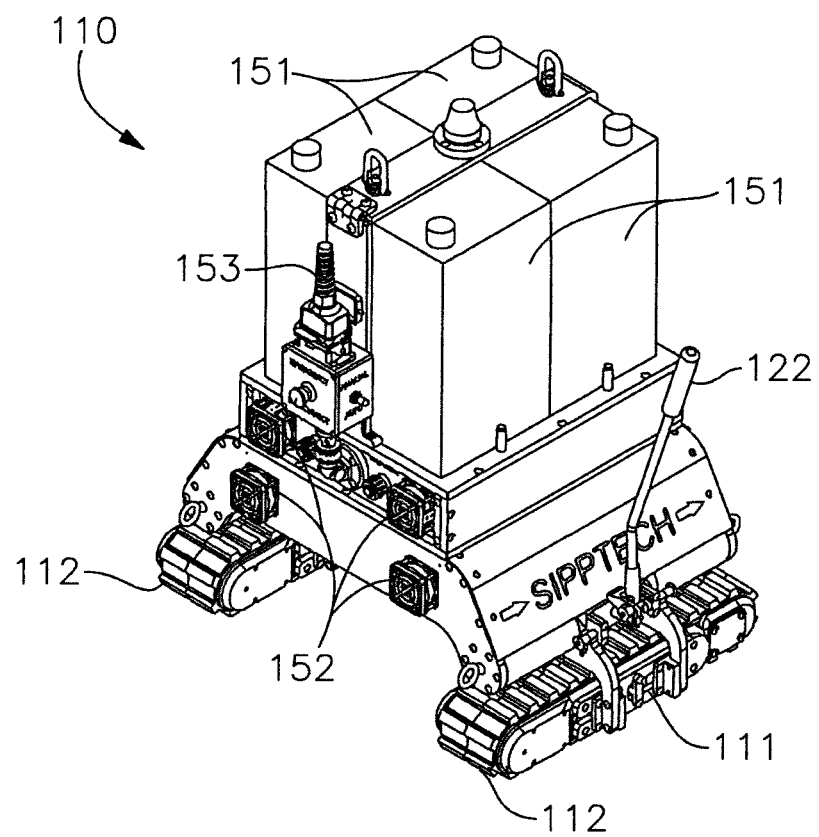
FIG. 12 is a perspective view of an alternate embodiment of the propulsion device for thee system which comprises a clamping mechanism for mounting the propulsion device on the exterior of the umbilical member, the propulsion device being self-propelled, self-powered and in wireless communication with the operator.
Figure 14:
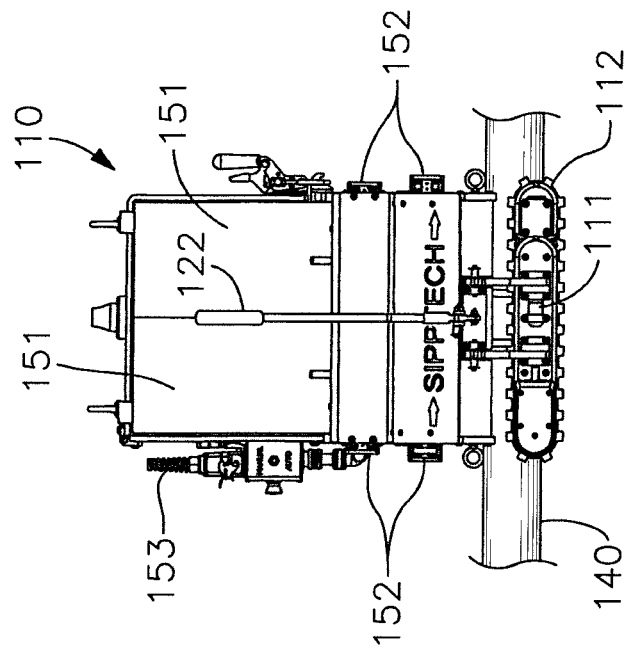
FIG. 14 is a side view of the propulsion device of FIG. 12, shown as mounted onto the umbilical member.
Figure 13:
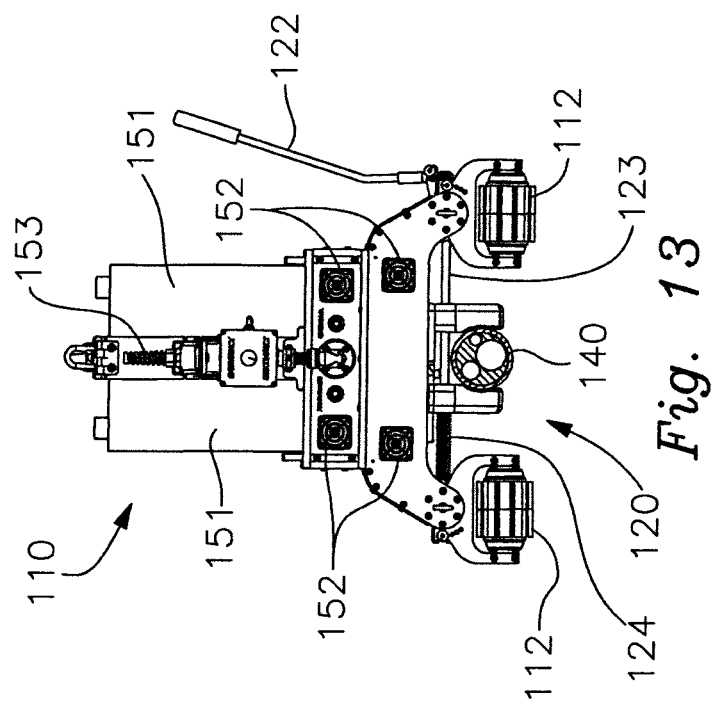
FIG. 13 is a front view of the propulsion device of FIG. 12, shown as mounted onto the umbilical member.

Alternative embodiments for the invention are shown in FIGS. 12 through 14, wherein the propulsion devices 110 are both self-propelled and self-powered, such that no external power source is required for each propulsion device 110, and further such that the propulsion devices 110 communicate wirelessly with the operator. As above, the term "self-propelled" is used herein to designate a propulsion device 110 providing its own motive force for movement through the pipe, such that it is not dragged or pushed through the pipe by the umbilical member 140 or by other system devices. Instead, the propulsion devices 110 are structured to move the umbilical member 140 through the pipe. For example, each prolusion device 110 is provided with one or more dedicated motorized drive units 111 which operate traction members 112 to move the propulsion device through the pipe.

The term "self-powered" is used herein to designate a propulsion device 110 that requires no external power for operation of the motorized drive units 111. Instead, one or more batteries 151 are provided on each propulsion device 110 to operate its electrical motorized drive units 111. The batteries 151 also provide power for sensors 152, wireless communication devices 153 or other power-requiring devices.

Because the propulsion devices 110 require and receive no electrical power or communications through the umbilical member 140, he propulsion devices 110 in these embodiments require no direct connections, fittings or ports with the umbilical member 140 and may be externally mounted to the umbilical member 140 at any location. Thus, for relatively heavy umbilical members 140 the propulsion devices 110 may be spaced at relatively short intervals along the umbilical member 140, while for relatively light umbilical members 140 the propulsion devices 110 may be spaced at relatively larger distances. The propulsion devices 110 may be mounted to the umbilical member 140 one after the other, or other operational devices of known type, such as for example taping or pugging devices, may be disposed between propulsion devices 110 as required for optimal movement.

Various mechanisms for mounting the propulsion devices 110 onto the exterior of the umbilical member 140, such as for example a clamping mounting assembly 120 as shown in the drawings. As illustrated, this mounting assembly 120 may comprise a pair of clamping jaws or members 121, one or both of which may be capable of movement together and apart from each other. The clamping jaws 121 are actuated by an externally mounted actuating handle 122 connected to a reciprocating clamp arm member 123 in the form of a rod which is received within a clamp sleeve member 124, such that movement of the actuating arm 122 closes and opens the clamping jaws 121. Alternatively, the actuating handle 122 may be connected to the clamp sleeve member, which would then be reciprocating. Other constructions for the mounting assembly 120 may also be utilized. In this manner, with the umbilical member 140 disposed beneath the propulsion device 110, the clamping jaws 121 are brought together or closed, thereby securing the propulsion device 110 onto the umbilical member 140 at the chosen location. To release the umbilical member 140 the operation is reversed and the clamping jaws are separated or opened such that the propulsion device 110 is free of the umbilical member 140.

In preferred embodiments sensors 152 are provided on the propulsion device 110, the sensors 152 comprising proximity sensors, cameras, or the like capable of providing information or data during operation of the propulsion device 110. The information or data is wirelessly transmitted to remotely located operators through wireless communication devices 153. Conversely, commands or instructions controlling operation of the propulsion devices 110 are wirelessly transmitted from the external operators to the propulsion devices 110. In an alternative embodiment, the propulsion devices 110 may be provided with processing systems (not shown) which receive input directly from the sensors 152 such that the propulsion devices 110 are capable to some extent of autonomous operation of steering, speed, direction, etc.

The propulsion devices 110, being independently self-propelled, are capable of maintaining the umbilical member 140 suspended so as to eliminate or reduce frictional contact with the pipe. The propulsion devices 110 are also capable of reducing or eliminating tension on the storage, delivery or feed mechanism of the umbilical member 140 during retrieval of the system from the pipe.

Because the propulsion devices 110 are self-powered, it is also possible to provide a pipe lining system that is self-contained during the pipe lining operation. This is accomplished by providing one or more non-stationary tank members (not shown) containing lining material, with the tank members being sized to fit within the pipe and being in communication with the sprayer apparatus of the system such that lining material is delivered to the sprayer apparatus through the umbilical member 140. The tank members are provided with wheels, rollers of the like to facilitate movement through the pipe, and may have a dedicated propulsion member 110 associated with one or more of the tank members. With this self-contained system, the umbilical member 140 does not extend back through the pipe to external devices since the system requires no external supply of lining material, no external supply of power and no wired communication. The lining operation is accomplished by the entire system moving through the pipe in the manner of a railroad train moving down a track, controlled either externally through wireless communication, internally through autonomous control, or by a combination of both.

It is contemplated that equivalents and substitutions for certain elements and structures described above may be obvious to those skilled in the art, and therefore the true scope and definition of the invention is to be as set forth in the following claims.

We claim:

1. An internal pipe lining system comprising:
 a sprayer apparatus and propulsion devices, each of said sprayer apparatus and said propulsion device capable of independent movement within a pipe;
 said sprayer apparatus applying a curable lining material to the interior of the pipe;
 an umbilical member through which said curable lining material is delivered to said sprayer apparatus, said umbilical member being connected to said sprayer apparatus; and
 propulsion devices removably mounted onto said umbilical member at spaced intervals separated from said sprayer apparatus, each of said propulsion devices being self-propelled and self-powered for movement through the pipe, each of said propulsion devices comprising one or more motorized drive units each actuating a traction member and a mounting assembly grasping said umbilical member; each of said propulsion devices receiving no power from said umbilical member and communicating wirelessly with an external operator;
 wherein each of said propulsion devices is independently controlled, such that the travel speed of each of said propulsion devices can be increased or decreased independently;
 wherein said sprayer apparatus and said propulsion devices are connected to each other only by said umbilical member;
 wherein each of said propulsion devices further comprises one or more batteries to power said one or more motorized drive units;
 wherein said propulsion devices are removable from and remountable onto said umbilical member at any location on said umbilical member; and
 wherein said propulsion devices transport said umbilical member through said pipe and are spaced such that contact between said umbilical member and said pipe is reduced during movement of said umbilical member through said pipe.

2. The system of claim 1, wherein each of said propulsion devices comprises one or more sensors.

3. The system of claim 2, wherein each of said propulsion devices further comprises a processing system receiving information from said one or more sensors such that each of said propulsion devices is capable of autonomous operation.

4. The system of claim 1, wherein said system is self-contained such that said umbilical member does not extend from the pipe during application of the lining material to the pipe.

5. The system of claim 1, wherein said mounting assembly comprises clamping jaws structured to receive said umbilical member therebetween.

6. The system of claim 5, wherein said mounting assembly further comprises an actuating handle, a clamp arm member and clamp sleeve member wherein said clamping jaws and can be closed to secure said propulsion device onto said umbilical member by actuating said actuating handle and can be opened to release said propulsion device from said umbilical member by actuating said actuating handle.

\* \* \* \* \*